United States Patent
Yano

(10) Patent No.: US 6,900,832 B1
(45) Date of Patent: May 31, 2005

(54) SOLID-STATE IMAGE PICKUP APPARATUS ADAPTIVE TO DIFFERENT DISPLAY MODES AND HAVING A HIGH PIXEL DENSITY, SYNCHRONOUS VIDEO OUTPUT CAPABILITY AND A METHOD OF SIGNAL PROCESSING

(75) Inventor: Takashi Yano, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/415,060

(22) Filed: Oct. 12, 1999

(30) Foreign Application Priority Data

Oct. 12, 1998 (JP) .......................................... 10/289374

(51) Int. Cl.[7] ........................ H04N 5/228; H04N 5/225; H04N 5/222; H03M 1/12
(52) U.S. Cl. ............................... 348/222.1; 348/220.1; 348/333.01; 341/155
(58) Field of Search ................................ 341/155–172; 348/348, 220.1, 222.1, 333.01

(56) References Cited

U.S. PATENT DOCUMENTS

| | | | | |
|---|---|---|---|---|
| 3,976,842 A | * | 8/1976 | Hoyt | 704/201 |
| 5,206,730 A | * | 4/1993 | Sakai | 348/220.1 |
| 5,382,974 A | * | 1/1995 | Soeda et al. | 348/220.1 |
| 5,734,427 A | * | 3/1998 | Hayashi | 348/333.11 |
| 6,057,795 A | * | 5/2000 | Suzuki | 341/155 |
| 6,377,301 B1 | * | 4/2002 | Hieda | 348/231.99 |
| 6,518,999 B1 | * | 2/2003 | Miyamoto | 348/220.1 |
| 6,522,356 B1 | * | 2/2003 | Watanabe | 348/275 |
| 6,529,236 B1 | * | 3/2003 | Watanabe | 348/230.1 |

FOREIGN PATENT DOCUMENTS

| | | | | | |
|---|---|---|---|---|---|
| JP | 04-170176 A | * | 6/1992 | ......... | H04N/5/335 |
| JP | A6-141330 | | 5/1994 | | |
| JP | 06-141330 A | * | 5/1994 | ............ | H04N/9/07 |

* cited by examiner

Primary Examiner—Andrew Christensen
Assistant Examiner—Nhan T. Tran
(74) Attorney, Agent, or Firm—Birch, Stewart, Kolasch & Birch, LLP

(57) ABSTRACT

A solid-state image pickup apparatus includes a mode setting circuit for allowing the operator to select desired one of the modes matching with the display format of a display which displays a video signal fed thereto. A clock generating circuit generates clocks including a first clock and a second clock higher in frequency than the first clock. A frequency selector selects either one of the first and second clocks in accordance with a mode fed from the mode setting circuit. An image pickup section includes a plurality of photosensitive cells for transforming, by photoelectric transduction, light incident thereto from a scene to be picked up. The image pickup section picks up the scene and produces signal charges representative of the scene in accordance with the output of the frequency selector. A noise reducing circuit reduces noise components included in a signal output from the image pickup section. A digitizing circuit converts the output of the noise reducing circuit to a digital signal in accordance with the first clock. A signal processing circuit processes the output of the digitizing circuit in a manner matching with picture display and/or recording. A controller controls the clock generating circuit, frequency selector, image pickup section, noise reducing circuit, digitizing circuit, and signal processing circuit. The modes include a first mode in which the frequency selector outputs the first clock and a second mode in which it outputs the second clock.

18 Claims, 11 Drawing Sheets

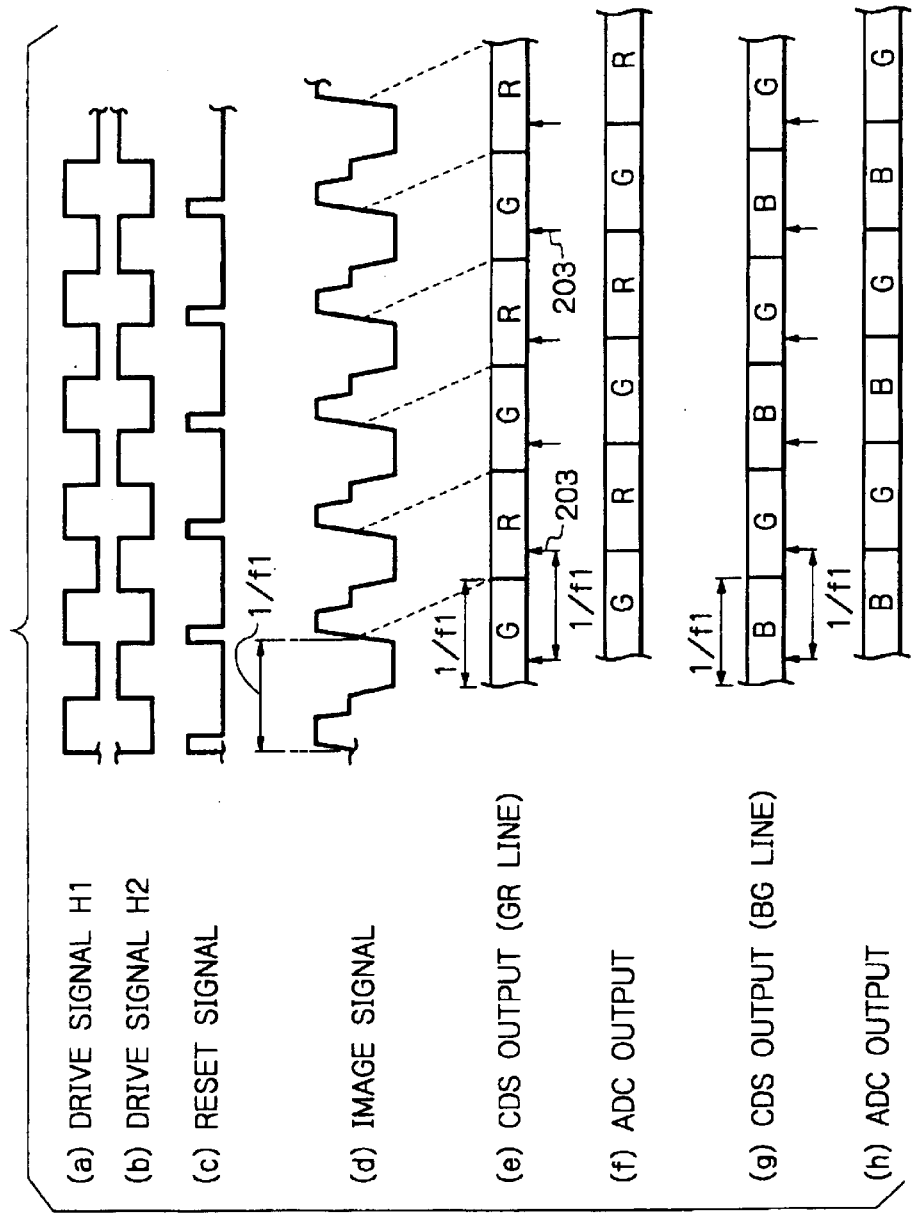

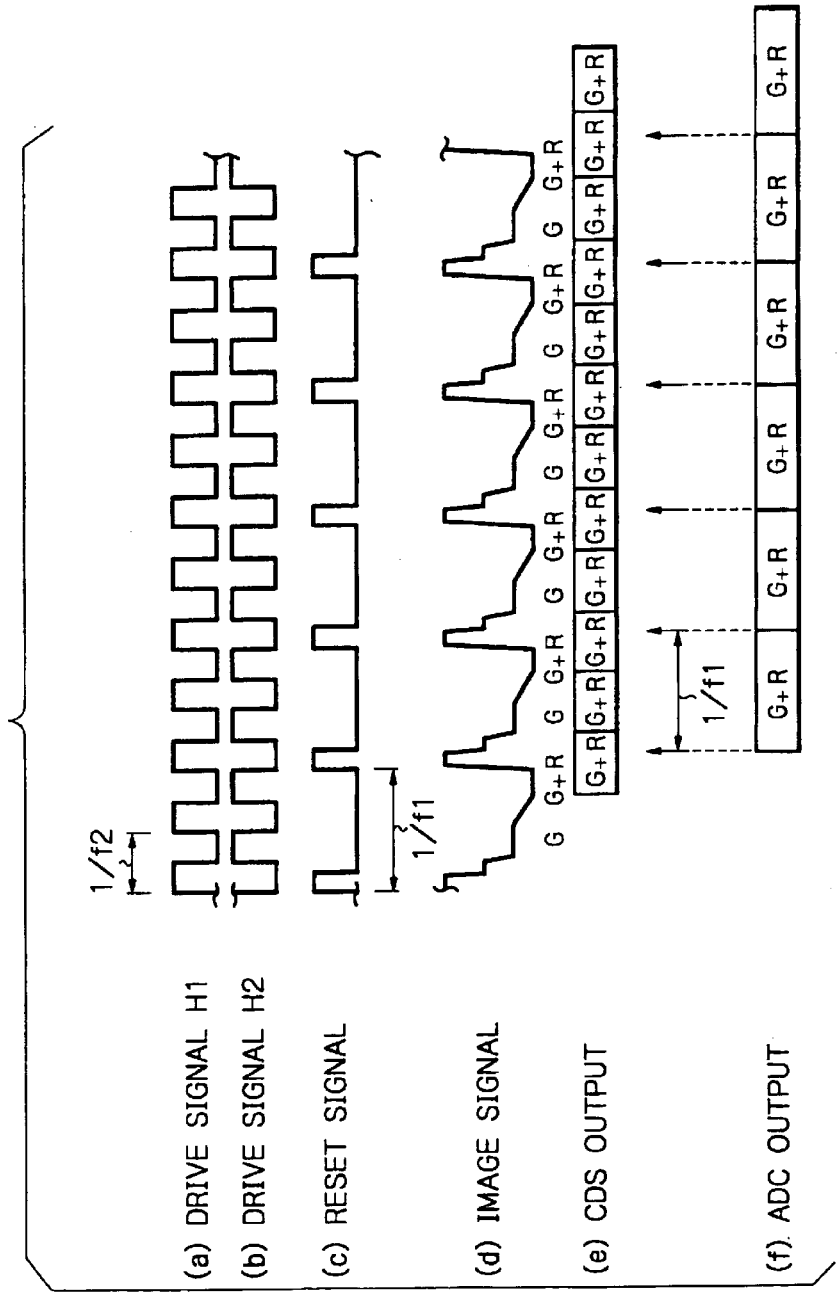

SOLID-STATE IMAGE PICKUP APPARATUS ADAPTIVE TO DIFFERENT DISPLAY MODES AND HAVING A HIGH PIXEL DENSITY, SYNCHRONOUS VIDEO OUTPUT CAPABILITY AND A METHOD OF SIGNAL PROCESSING

BACKGROUND OF THE INVENTION

1. Field of the Invention

The present invention relates to a solid-state image pickup apparatus adaptive to a plurality of different display modes and having a high pixel density, synchronous video output capability and a method of signal processing. Particularly, the image pickup apparatus of the present invention is advantageously applicable to a digital camera, image input device or similar imaging equipment having a great number of pixels, e.g., several hundred thousands to several millions of pixels.

2. Description of the Background Art

Digital cameras available on the market today include an electronic camera using as many as, e.g., several hundred thousands to several millions of photosensitive cells, or pixels, constituting the basic devices of an image pickup section. With such a great number of photosensitive cells, the electronic camera is expected to realize image quality comparable with one achievable with a traditional silver-halide sensitive type of camera. It is a common practice with the electronic camera to write all or part of pixel data constituting a picture in a frame memory. The pixel data may be read out of the frame memory under the control of a system controller and displayed on a display in the form of a picture. In the event of reading of the pixel data, the system controller controls the frame memory on the basis of the vertical rate and horizontal rate of an NTSC (National Television System Committee), PAL (Phase Alternation by Line) or similar current broadcast system adaptive to a display. Consequently, an image pickup section or input section for picking up a scene and a display section or output section for displaying data output from the pickup section are not synchronous in timing to each other.

To synchronize the image pickup section and display section with respect to pixel data, it is necessary to increase the rate at which the pixel data are read out of the image pickup section or to skip, or reduce, the pixel data output from the above section at preselected intervals.

Assume that a signal representative of a scene picked up is read out of the image pickup apparatus at a high speed for implementing, e.g., an asynchronous movie. Then, it is difficult to make the most of the expected functions of various devices, e.g., noise reduction based on the correlation double sampling of the signal, signal amplification, and valid bits of analog-to-digital conversion. As a result, the signal output from the image pickup apparatus is lowered in SN (Signal-to-Noise) ratio. Further, this kind of scheme obstructs matching to be effected during, e.g., signal processing by a digital encoder later and aggravates power consumption due to the high-speed processing.

On the other hand, the pixel skipping or reduction scheme reduces the number of pixels only in the vertical direction and therefore sacrifices the vertical resolution of a picture. For example, assume that the number of pixels of the image pickup section is four times as great as a VGA (Video Graphics Array) size, and that data are read out of the pixels in accordance with a clock having a frequency of 12 MHz and synchronously displayed on a display of VGA size. Then, it is necessary to reduce the number of pixels to be read to one-fourth. In practice, however, the pixels are reduced to one-eight in the vertical direction field by field in the NTSC or the PAL system so as to implement one-fourth reduction relatively easily. In this case, the pixels are not reduced in the horizontal direction because horizontal reduction is difficult to perform due to the arrangement of the photosensitive devices of the image pickup section. As a result, one horizontal period of the image pickup corresponds t two horizontal periods for the display. The picture reduce only in the vertical direction is ill balanced, compared to a picture reduced by half in both of the horizontal and vertical directions.

SUMMARY OF THE INVENTION

It is therefore an object of the present invention to provide a solid-state image pickup apparatus with an image pickup section implemented by as many as several hundred thousands to several millions of pixels and capable of synchronizing the image pickup section to a display section with respect to a signal and displaying a well balanced picture on the display section, and a method of signal processing.

A solid-state image pickup apparatus of the present invention includes a mode setting circuit for allowing the operator of the apparatus to select desired one of a plurality of modes matching with the display format of a display which displays a video signal fed thereto. A clock generating circuit generates a plurality of clocks including a first clock and a second clock higher in frequency than the first clock. A frequency selector selects either one of the first and second clocks in accordance with a mode fed from the mode setting circuit. An image pickup section includes a plurality of photosensitive cells for transforming, by photoelectric transduction, light incident thereto from a scene to be picked up. The image pickup section picks up the scene and produces signal charges representative of the scene in accordance with the output of the frequency selector. A noise reducing circuit reduces noise components included in a signal output from the image pickup section. A digitizing circuit converts the output of the noise reducing circuit to a digital signal in accordance with the first clock. A signal processing circuit processes the output of the digitizing circuit in a manner matching with picture display and/or recording. A controller controls the clock generating circuit, frequency selector, image pickup section, noise reducing circuit, digitizing circuit, and signal processing circuit. The plurality of modes include a first mode in which the frequency selector outputs the first clock and a second mode in which it outputs the second clock.

BRIEF DESCRIPTION OF THE DRAWINGS

The objects and features of the present invention will become more apparent from the consideration of the following detailed description taken in conjunction with the accompanying drawings in which:

FIG. 10 is a timing chart representative of a still picture shoot mode particular to the second modification; and FIG. 11 is a timing chart showing a movie mode also particular to the second modification.

DESCRIPTION OF THE PREFERRED EMBODIMENTS

A preferred embodiment of the solid-state image pickup apparatus in accordance with the present invention will be described hereinafter. Briefly, the image pickup apparatus to be described includes a clock generating means capable of outputting a plurality clocks each having a particular frequency. The clocks include a first clock and a second clock higher in frequency than the first clock. A frequency selector selects the first clock or the second clock in accordance with a mode selected by the operator of the apparatus and feeds it to an image pickup means. The first clock is fed to a digitizing means. In a first mode, the digitizing means effects analog-to-digital conversion at the same rate as a signal input thereto. In a second mode, the digitizing means effects the conversion at a lower rate corresponding to the frequency of the first clock, thereby reducing the number of pixels in the horizontal direction. Particularly, by sampling data at a rate lower by 1/integer, it is possible to effect horizontal reduction by 1/integer with accuracy.

Figure 1:
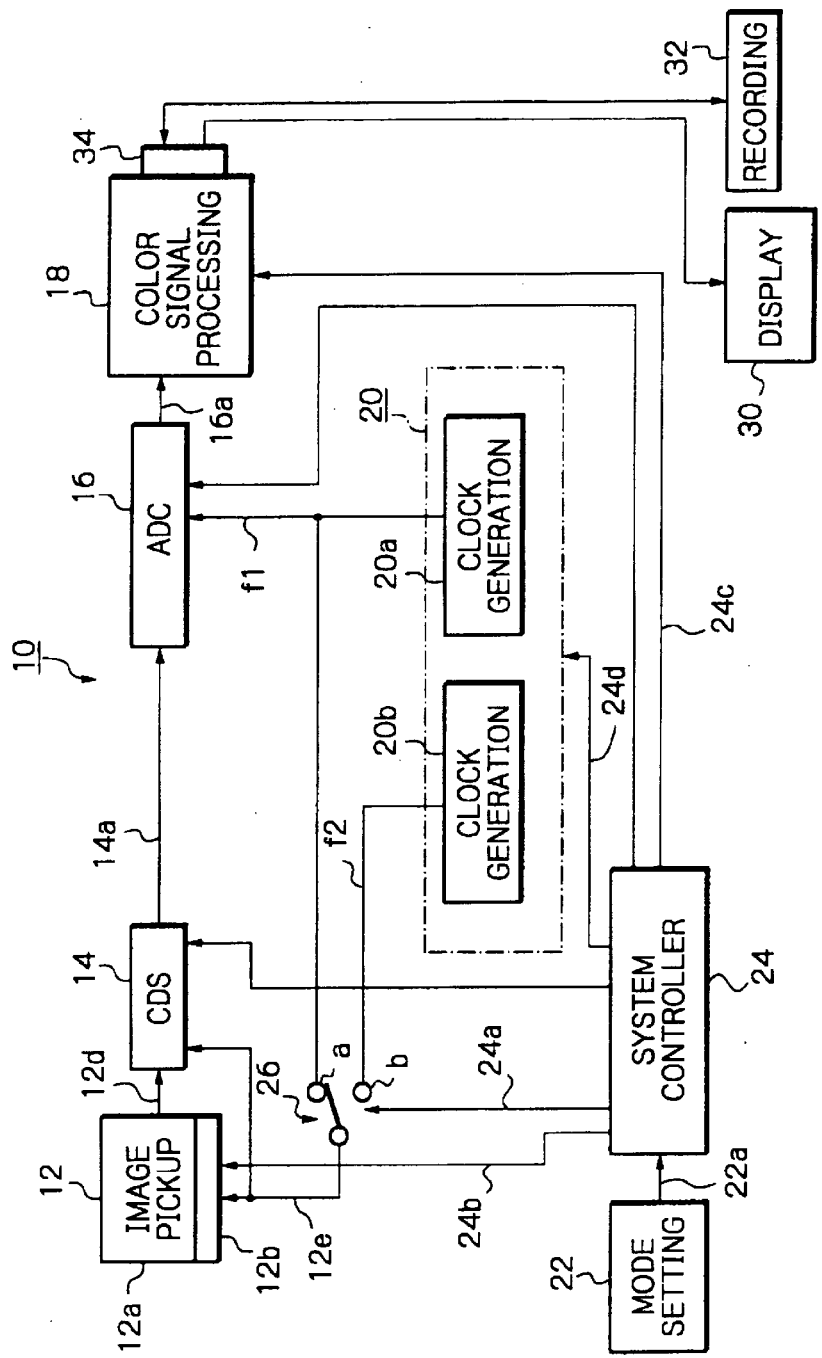
FIG. 1 is a block diagram schematically showing a digital camera to which a solid-state image pickup apparatus embodying the present invention is applied.

Referring to FIG. 1 of the drawings, a digital camera including a solid-state image pickup apparatus embodying the present invention is shown and generally designated by the reference numeral 10. As shown, the digital camera 10 includes an image pickup 12, a CDS (Correlation Double Sampling) 14, an ADC (Analog-to-Digital Conversion) 16, a color signal processing 18, a system clock generating section 20, a mode setting 22, a system controller 24 and a clock selector 26 as well as conventional optics not shown. The camera 10 additionally includes an input/output terminal 34 connected t a display 30 and a recording 32 positioned outside of t camera 10. The input/output terminal 34 sends a signal output from the color signal processing 18 to the display 30 and/or the recording 32 or receives a signal from the recording 32, as needed.

Figure 2:
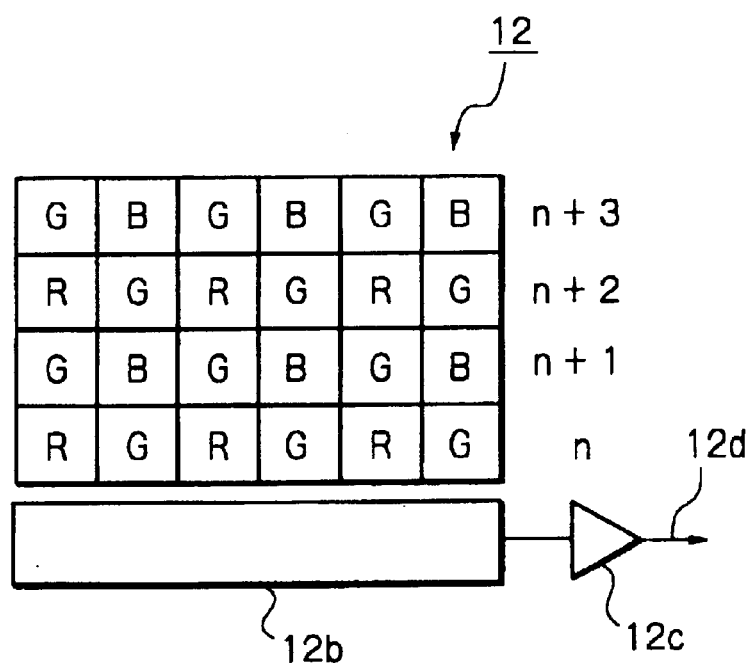
FIG. 2 is a schematic view showing a specific configuration of an image pickup section included in the illustrative embodiment.

The image pickup 12 has photosensitive devices arranged bidimensionally for converting incident light to signal charges by photoelectric transduction, although not shown specifically. As shown in FIG. 2, R (red), G (green) and B (blue) color filters are positioned in, e.g., a Bayer arrangement at the front of the image pickup 12 to which light representative of a desired scheme is incident; each color filter adjoins a particular photosensitive device. In this specific case, the image pickup 12 has a photosensitive array 12a made up of more than 300,000 photosensitive cells. Vertical transfer paths, not shown, each adjoin a particular column of photosensitive cells. A horizontal transfer path 12b sequentially transfers, in the horizontal direction, signals input thereto from the vertical transfer paths. Specifically, the horizontal transfer path 12b outputs line-by-line (or pixel-by-pixel) signals 12d via an output amplifier 12c (see FIG. 2 by way of example). A drive signal 12e for driving the horizontal transfer path 12b is fed to the path 12b via the clock selector 26. Timing control relating to the start and stop of drive and other operations of the image pickup 12 is effected by a control signal 24b output from the system controller 24. For the photosensitive array of the image pickup 12, use may be made of an image sensor implemented by CCDs (Charge Coupled Devices) or MOSs (Metal Oxide Semiconductors) by way of example.

The CDS 14 reduces major noise appearing at the photosensitive cells of the image pickup 12. This noise reduction is based on the fact that noise included in a field-through period and noise included in a signal period have the same correction. For example, with a clamping circuit, not shown, the CDS 14 turns on a reset switch, not shown, and then clamps the potential at a preselected value. As a result, only reset noise appears during field-through period. During signal period, the CDS 14 turns on a sampling switch, not shown, so as to hold a signal 14a in a capacitor not shown. The signal 14a is free from the level of the reset noise and therefore reduced in noise. The sampling switch samples the input signal in accordance with a clock 12e input thereto via the system selector 26.

The ADC 16 samples the signal 14a output from the CDS 14 in accordance with a sampling frequency f1 for thereby converting it to a digital signal 16a. In the illustrative embodiment, the sampling frequency f1 for the ADC 16 is implemented by a first clock having a frequency of 12 MHz by way of example. The ADC 16 receives the first clock f1 from a clock generation 20a included in the clock generating section 20 and operates under the control of the system controller 24.

The color signal processing 18 performs signal processing based on the NTSC system or the PAL system. Particularly, the color signal processing 18 executes processing for display and processing for recording with data input thereto. The processing for display includes the transform of a signal format to one matching with the display 30, gamma correction or color correction, and aperture correction for a luminance signal. The processing for recording includes JPEG (Joint Photographic image coding Experts Group) compression of signals to be recorded in a recording medium mounted on the recording 32 (recording) and the expansion of compressed signals read out of the recording medium (reproduction). The color signal processing 18 interchanges data with the display 30 and recording 32 under the control of the system controller 24.

The system clock generating section 20 has a clock generation 20b in addition to the clock generation 20a which outputs the first clock f1 having the frequency of 12 MHz, as mentioned earlier. The clock generation 20b outputs a second clock f2 having a frequency which is the integral multiple of the frequency of the first clock f1. In the illustrative embodiment, therefore, the second clock f2 has a frequency of 24 MHz. The fact that the clock f2 is higher in frequency than the clock f1 is one of characteristic features of the embodiment. If desired, the clock f2 may be halved in frequency and then fed to the clock generation 20a for implementing the clock f1. The first clock f1 is delivered to the ADC 16 and a terminal a included in the clock selector 26. The second clock f2 is fed to a terminal b also included in the clock selector 26. The operation of the system clock generating section 20 is controlled by a signal 24d also output from the system controller 24.

The mode setting 22 is implemented by a mode switch arranged on the outside of the casing, not shown, of the camera 10. The operator of the camera 10 is capable of selecting desired one of a plurality of operation modes available with the camera 10 on the mode setting 22. The mode setting 22 delivers a signal 22a representative of the mode selected by the operator to the system controller 24. The modes available with the camera 10 include a still picture shoot mode (first mode), a movie adaptive and electronic viewfinder display mode (second mode; movie mode hereinafter), a high picture quality mode (third mode), and an AE (Automatic Exposure/AF (Automatic Focus) mode (fourth mode; AE/AF mode hereinafter).

The system controller 24 controls the operation timings of the various sections of the camera 10 while controlling various kinds of signal processing. Particularly, the system controller 24 adjusts the operation and control over the various sections in accordance with a mode selected by the operator on the mode setting 22. In the illustrative embodiment, the system controller 24 feeds a clock select signal 24a to the clock selector 26 for controlling the operation.

The display 30 displays a video signal input thereto in the NTSC format or the PAL format and is implemented by, e.g., an electronic viewfinder or an LCD (Liquid Crystal Display) monitor. The recording 32 is capable of recording data in a semiconductor recording medium or so-called smart medium or a magnetic, optical and/or an magnet-optical recording medium and allowing the data to be read thereout. If desired, the display 30 and recording 32 may be controlled together by a control signal fed from the system controller 24 via the input/output terminal 34.

Figure 3:
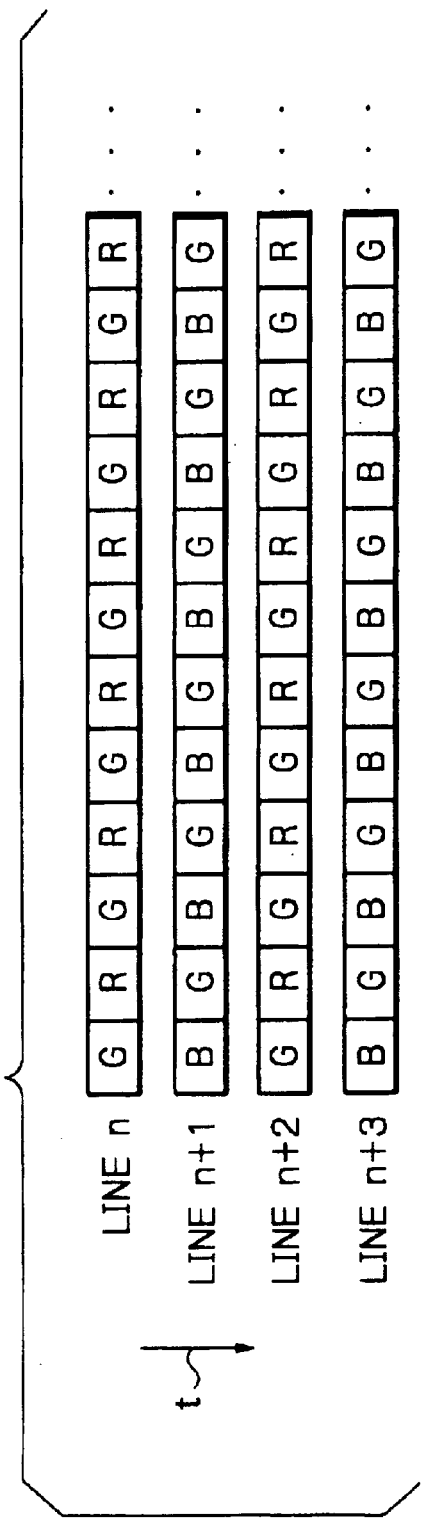
FIG. 3 is a schematic view showing signals read out of the image pickup section of FIG. 2, i.e., the order of signal lines.

The digital camera 10 having the above construction will be operated as follows. The image pickup 12 has the color filters positioned in the Bayer arrangement in one-to-one correspondence to the photosensitive devices or pixels (or cells), as stated earlier. As shown in FIG. 2, assume that the color filters are arranged in four consecutive horizontal lines or rows n, n+1, n+2 and n+3; the line n is closest to the horizontal transfer path 12b while the line n+3 is farthest from the same. Then, signal charges sequentially vertically transferred, as indicated by an arrow t in FIG. 3, are output via the horizontal transfer path 12b and output amplifier 12c in the order of the lines n, n+1, n+2 and n+3. It will be seen that the color combination GR and color combination BG each are output line by line because the Bayer arrangement cannot output all of the three primary colors R, G and B in a single line.

Assume that the operator of the camera 10 selects the still picture shoot mode (still shot) on the mode setting 22. Then, the system controller 24 sends the clock select signal 24a representative of the still picture shoot mode to the clock selector 26. In response, the clock selector 26 selects the terminal a. As a result, the first clock f1 output from the clock generation 20a is delivered to the image pickup 12 via the clock selector 26 as a read signal. Further, the system controller 24 feeds a control signal 24b to the image pickup 12 as a timing control signal. The image pickup 12 receives incident light in accordance with the control signal 24b and delivers the resulting signal 12d (see FIG. 4, (a)) to the CDS 14 at a rate equal to the clock f1 (12 MHz).

Figure 4:
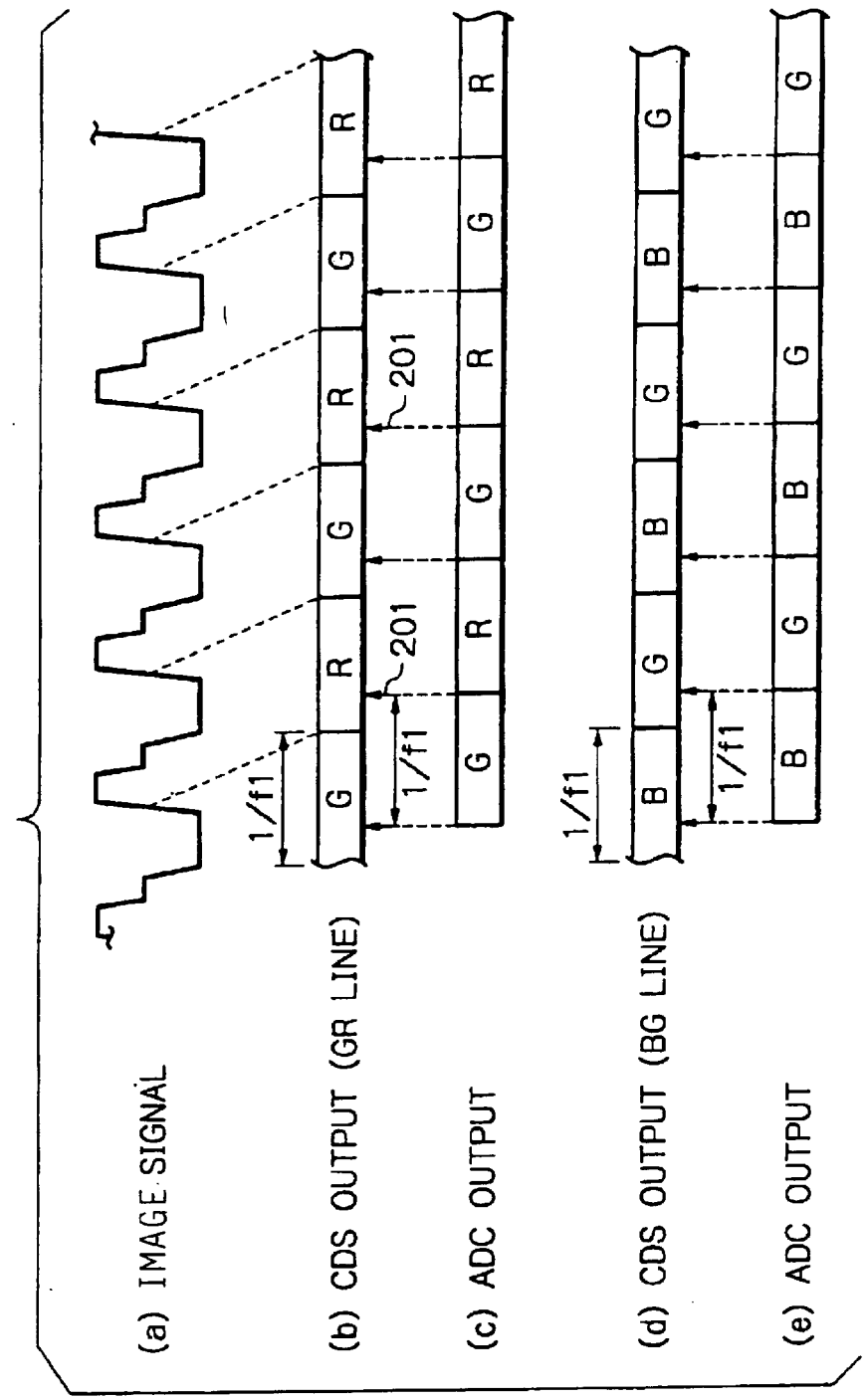
FIG. 4 is a timing chart demonstrating a still picture shoot mode available with the camera of FIG. 1.

In the above condition, the clock f1 is fed to the CDS 14 as well as to the image pickup 12. The clock f1 defines a sampling interval for sampling the signal 12d at a sampling period of 1/f1. On the other hand, the control signal 24b output from the system controller 24 defines a sampling start timing. As shown in FIG. 4, (b), the CDS 14 executes noise reduction with the above signal 12d and delivers the resulting signal 14a to the ADC 16. The ADC 16 samples the output signal 14a of the CDS 14 at positions indicated by arrows 201 in FIG. 4, (b), while outputting the sampled signal 16a shown in FIG. 4, (c). The lines n+1 and n+3 representative of the colors B and G and subjected to noise reduction at the CDS 14 are shown in FIG. 4, (d). FIG. 4, (e) shows the output signal 16a of the ADC 16 having also be sampled at the period of 1/f1. This means that the signal representative of the scene picked up flows from the image pickup 12 to the ADC 16 without any distinction between lines and is output via the color signal processing 18. The resulting number of pixels is four times as great as the number of pixels particular to the VGA size. Therefore, when one frame is read at the rate of the clock f1, a frame rate (1/7.5 second) four times as high as the frame rate particular to the VGA size is achievable. It follows that in the still picture shoot mode except for continuous shooting, only the desired or current still shot should only be taken into account, i.e., all the pixel information can be read out by taking a sufficient period of time. This allows the camera 10 to output a picture with high resolution in the still picture shoot mode.

Figure 5:
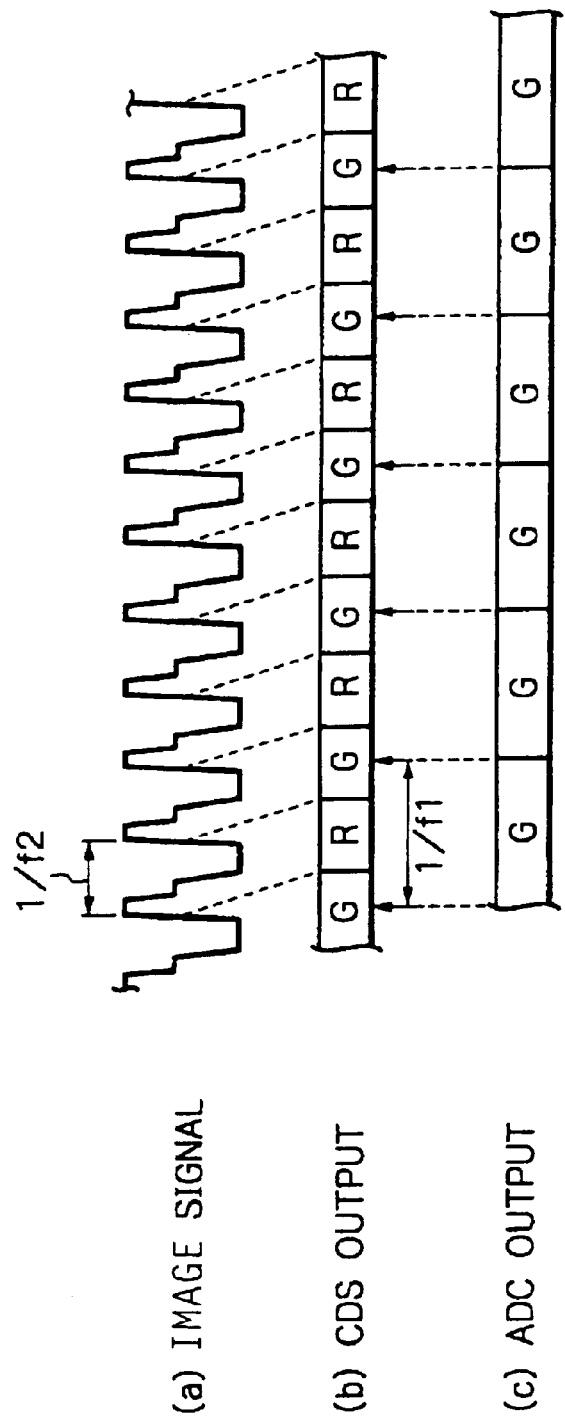
FIG. 5 is a timing chart demonstrating a movie mode also available with the camera of FIG. 1.

Assume that the operator selects the movie mode on the mode setting 22. Then, the system controller 24 causes the clock selector 26 to select the terminal b with the clock select signal 24a. As a result, the second clock f2 output from the clock generation 20b is fed to the image pickup 12 and CDS 14 via the clock selector 26. In the illustrative embodiment, the frequency of the second clock f2 is 24 MHz which is two times as high as the frequency of the first clock f1, as stated previously. As shown in FIG. 5, (a), by reading the signal 12d out of the image pickup 12 at the rate of the clock f2, it is possible to reduce the required reading time to one half of the reading period shown in FIG. 4, (a). The CDS 14 also executes noise reduction at the above rate.

The ADC 16 samples the output signal 14a of the CDS 14 in accordance with the first clock f1 in the same manner as in the still picture shoot mode and thereby digitizes the signal 14a. Consequently, the ADC 16 samples only the color G at all times (see FIG. 5, (c)) for thereby halving the number of pixels horizontally output. Although the signal of this line is representative of only the color G, the three primary colors R, G and B can be output at the rate of the clock f1 only if the phase of the image pickup 12 or that of the ADC 16 is shifted line by line. The prerequisite is that the above phase be controlled with utmost precision. Despite that the ADC 16 outputs the signal 16a at the same rate, the movie mode is practicable with a horizontal reading time which is only one half of the horizontal reading time required of the still picture shoot mode. This is because the number of pixels to be read in the movie mode is only one half of the number of pixels which is four times as great as the VGA size.

The color signal processing 18 executes conventional signal processing with the output signal 16a of the ADC 16. In addition, the color signal processing 18 separates the signal 16a color by color on the basis of the mode and performs AE, AWB (Automatic White Balance), AF and other processing with the individual color. To reduce the number of pixels to one-fourth in the vertical direction, the processing 18 samples the pixels every other line and forms a single line with the resulting GR line and a BG line adjoining each other. Further, the image is read at a rate of 1/60 second for a field. With this procedure, it is possible to implement a synchronous movie without resorting to a frame memory and therefore to save power to be consumed by the camera 10. When the pixels reduced in number to one-fourth are subjected to interlacing, a picture signal halved in both of the horizontal and vertical directions is achievable at a higher speed in the movie mode than in the still picture shoot mode. The picture evenly reduced in the horizontal and vertical directions appears well balanced, compared to a picture subjected to the conventional reduction. Moreover, one horizontal period of the image pickup 12 and that of the output line accurately correspond to each other, rendering signal processing to follow easy to execute.

Figure 6:
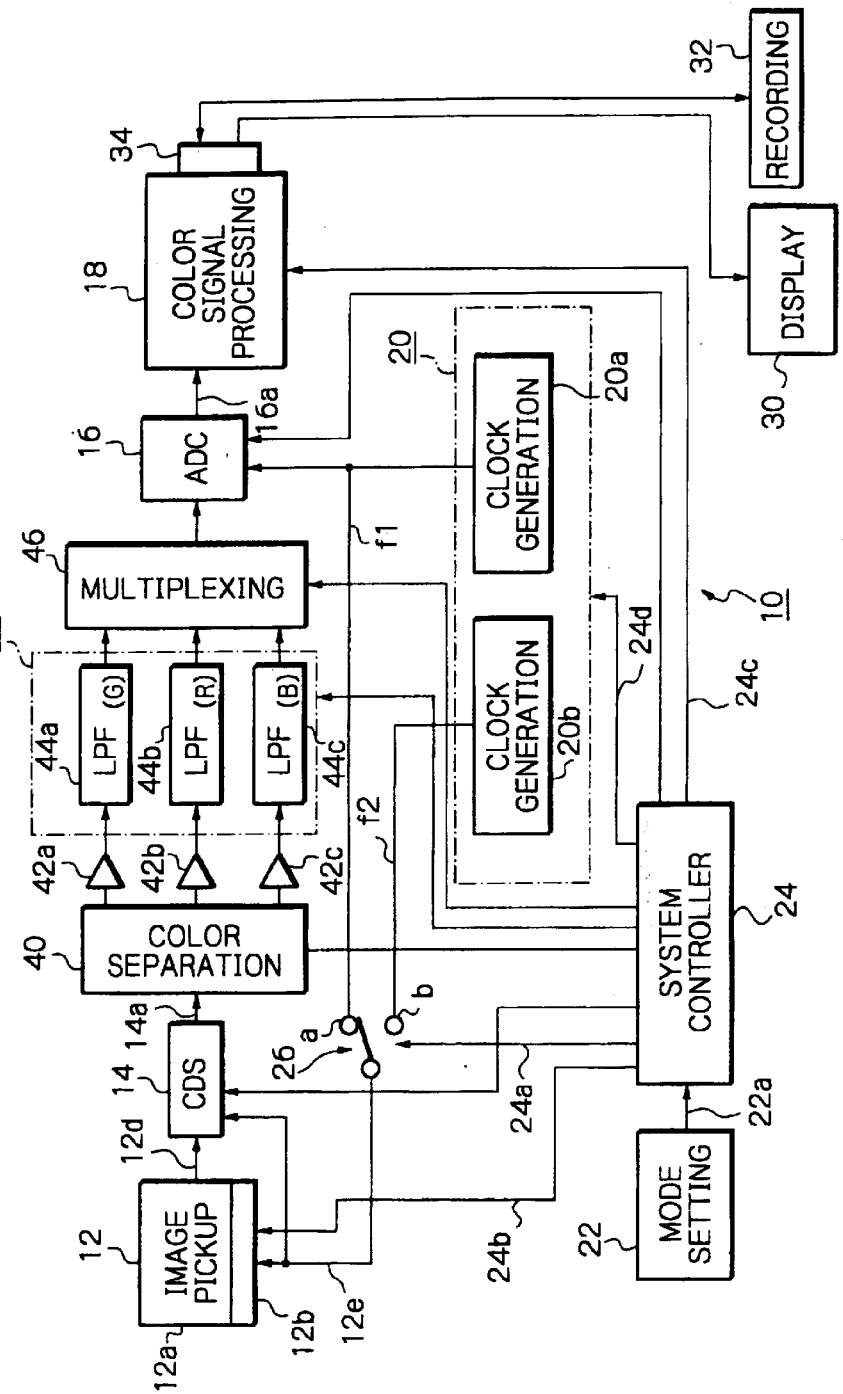
FIG. 6 is a schematic block diagram showing a first modification of the illustrative embodiment.

Referring to FIG. 6, a first modification of the illustrative embodiment will be described. In the modification, structural elements identical with the elements of the illustrative embodiment are designated by identical reference numerals and will not be described specifically in order to avoid redundancy. As shown, a color separation 40, three buffer amplifiers 42a, 42b and 42c, an LPF (Low-Pass Filter) section 44 and a multiplexing 46 are connected between the CDS 14 and the ADC 16. The CDS 14 serves mainly to reduce reset noise by noise reduction processing, as stated earlier. However, the problem is that high frequency noise components included in the signal are apt to turn back due to sampling and get in the frequency band of the video signal, aggravating the noise of the video signal. In light of this, the above additional circuitry arranged between the CDS 14 and ADC 16 limits the frequency band color by color. For conventional circuitry of this kind, reference may be made to Japanese patent laid-open publication No. 141330/1994 by way of example. The conventional circuitry is, however, mainly directed toward an ADC capable of reducing aliasing distortion ascribable to sampling essential with analog-to-digital conversion and thereby guaranteeing desirable image quality.

The color separation 40 separates, under the control of the system controller 24, the two-color image signal produced line by line and delivers the resulting three color signals to the buffer amplifiers 42a, 42b and 42c, respectively. Consequently, the outputs of the color separation 40 have a clock rate which is one half of the clock rate fed to the image pickup 12 and CDS 14.

The buffer amplifiers 42a–42c should preferably have a frequency which remains flat at least up to the cut-off frequency of the LPF section 44. The buffer amplifiers 42a–42c each are assigned to one of the primary colors R, G and B. The LPF section 44 is made up of three LPFs 44a, 44b and 44c respectively connected to the buffer amplifiers 42a–42c, i.e., respectively assigned to the primary colors G, R and B. The LPFs 44a–44c have a filter characteristic switchable in accordance with the mode selected on the mode setting 22.

The multiplexing 46 includes a sample-and-hold circuit and an analog switch, not shown, and provides the output signals of the LPFs 44a–44c with the original relation between the lines. Consequently, the output rate of the multiplexing 46 is the same as the output rate of the CDS 14.

The operation of the first modification will be briefly described hereinafter. When the operator selects the still picture shoot mode on the mode setting 22, the system controller 24 causes the clock selector 26 to select the terminal a, as in the illustrative embodiment. As a result, the first clock f1 is fed to the image pickup 12 and CDS 14 via the clock selector 26. The CDS 14 reads an image signal out of the image pickup 12 at the rate of the clock f1 while delivering it to the color separation 40 (see FIG. 7, (a)). The color separation 40 separates alternatively two colors included in each of the consecutive lines, thereby implementing a signal rate of 6 MHz (=clock f1/2). The signals R, G and B separated by the color separation 40 are input to the LPF section 44 via the buffer amplifiers 42a–42c.

The LPFs 44a–44c constituting the LPF section 44 each have a cut-off frequency close to the above signal rate of 6 MHz. Because signals to be actually passed through the LPFs 44a–44c have frequencies not higher than about 3 MHz, the above cut-off frequency may be 3 MHz or below, as will be described specifically later. With the LPF section 44, the first modification achieves a higher S/N ratio than the illustrative embodiment. The multiplexing 46 again combines the output signals of the LPFs 44a–44c line by line (see FIG. 7, (b)), thereby restoring the original signal rate of 12 MHz not subjected to color separation. The ADC 16 digitizes the signal shown in FIG. 7 (b) at a timing indicated by arrows.

The resulting digital signal is identical in relation to the signal shown in FIG. 4, (c). The color signal processing 18 executes various kinds of signal processing with the output signal 16a of the ADC 16 to thereby produce a digital processed signal, as in the illustrative embodiment. The output of the color signal processing 18 of the modification contains even less noise than the output of the same of the illustrative embodiment and therefore guarantees a still picture of high quality.

Figure 7:
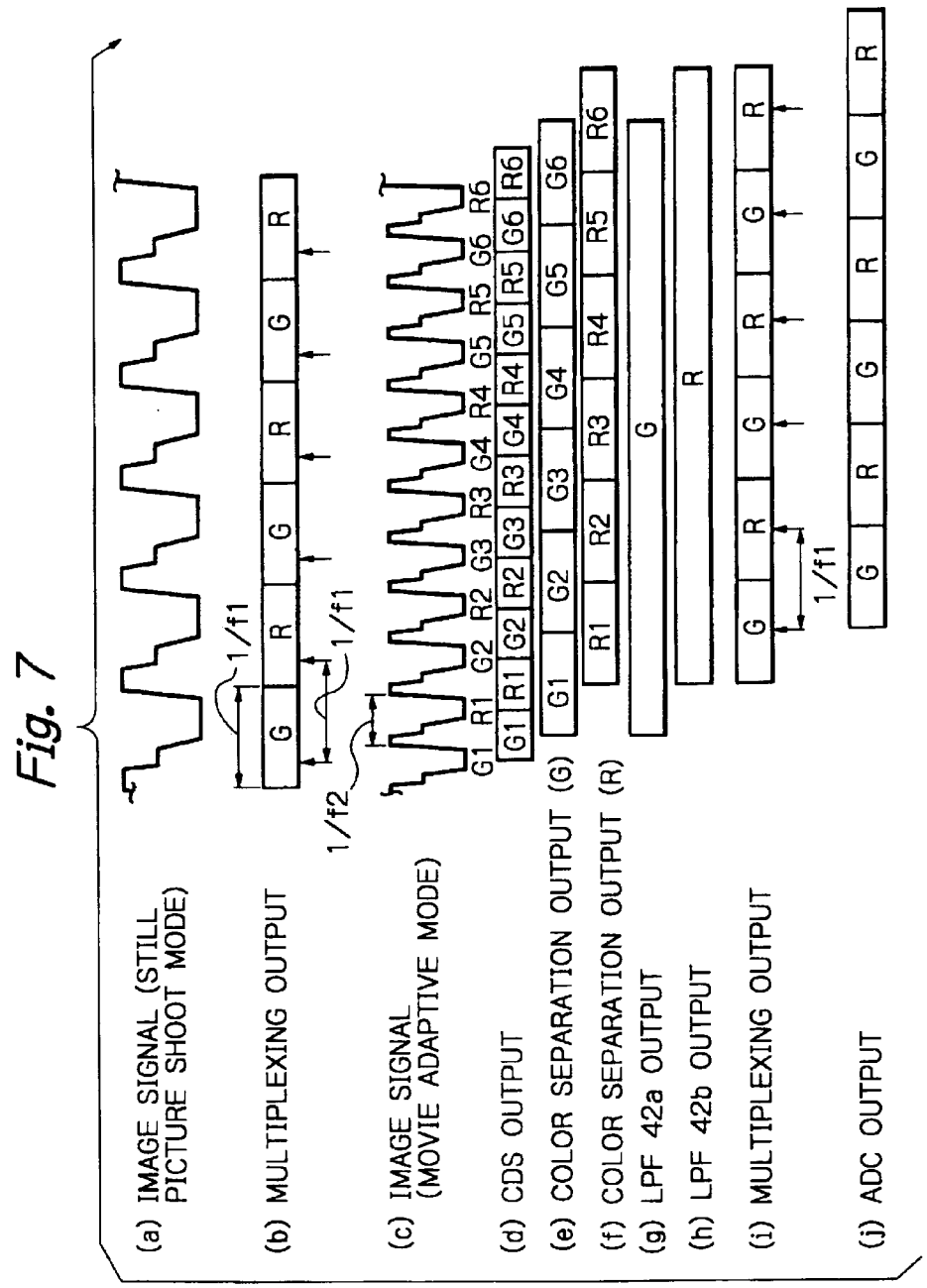
FIG. 7 is a timing chart representative of a still picture shoot mode and a movie mode particular to the first modification.

On the other hand, in the movie mode, the second clock f2 output from the clock generation 20b is fed to the image pickup 12 and CDS 14 (see FIG. 7, (c)), as in the illustrative embodiment. Specifically, in FIG. 7, (c), the colors G and R are individually serially numbered in order to show their relation in the time domain. The CDS 14 also outputs each line at the rate of the second clock f2 (see FIG. 7, (d)). The signals G and R shown in FIGS. 7, (e) and (f), respectively, and separated by the color separation 40 line by line each have a rate of 12 MH (=clock f2/2). The LPF section 44 limits the frequencies of such analog color signals G and R to 6 MHz (see FIGS. 7, (g) and (h)). In each of the LPF outputs shown in FIG. 7, (g) and (h), only the color signal on one line is significant. So limiting the frequency band is successful to enhance the S/N ratio of the signals, as stated previously. The LPF outputs limited in frequency are applied to the multiplexing 46. It is noteworthy that the above LPF processing has no influence on the processing including AE, AF and AWB to follow.

The multiplexing 46 distributes the colors of the input signals line by line at the period of 1/clock f1. As a result, a period of time allocated to, e.g, the combination of colors G and R is quadrupled; that is, the signal rate is clock f2/4. To sample each of the colors G and R in such a time zone, the clock f1 is fed to the ADC as in the illustrative embodiment. This is successful to read the signal at a higher speed than in the still picture mode for the same reason as described in relation the illustrative embodiment. Further, a frame memory which would aggravate the power consumption of the camera 10 is not necessary. In addition, the modification renders the picture well balanced and renders the following processing easy to execute.

It is to be noted that the clock frequency applied to the image pickup 12 and the clock frequency applied to the ADC 16 may not be in an integral ratio to each other. This is because the signal can be sampled in the color-by-color time zones even when the reading rate of the image pickup 12 and that of the ADC 16 are not synchronous to each other. In this case, one half of the frequency which is the signal rate of each color, i.e., the Nyquist frequency should preferably be assigned to the LPFs 44a–44c. In the illustrative embodiment, the signal rate of each color is 6 MHz, so that 3 MHz should preferably be assigned to the LPFs 44a–44c. It is therefore preferable to switch the characteristic of the LPFs 44a–44c between the still picture shoot mode and the movie mode.

As for a synchronous movie, the number of pixels and the frame rate for reading, e.g., 1/60 second are important factors. Because the circuitry to follow executes various kinds of signal processing with the above frequency, a change in the standard to be used would force the following circuitry to be changed. Particularly, a video encoder must be changed every time the frequency is changed. In accordance with the present invention, a particular reading rate is assigned to each of the image pickup 12 and ADC 16 and determined by the number of pixels and frame rate. On the other hand, a conversion rate coincident with the frequency of signal processing to follow is selected. Stated another way, the reading rate of the image pickup 12 and that of the ADC 16 can be freely selected without regard to the conversion rate, enhancing the design freedom of the camera 10.

While the color separation 40 of the above modification produces three different outputs by color separation, it may produce four or more different outputs, if desired. Particularly, the color G of the line included in the color combination GR and the color G of the line included in the color combination BG are different in spectral sensitivity from each other, as well known in the art. In light of this, the color separation 40 may additionally separate the color G itself and thereby produce four outputs so as to correct, e.g., color balance.

Figure 8:
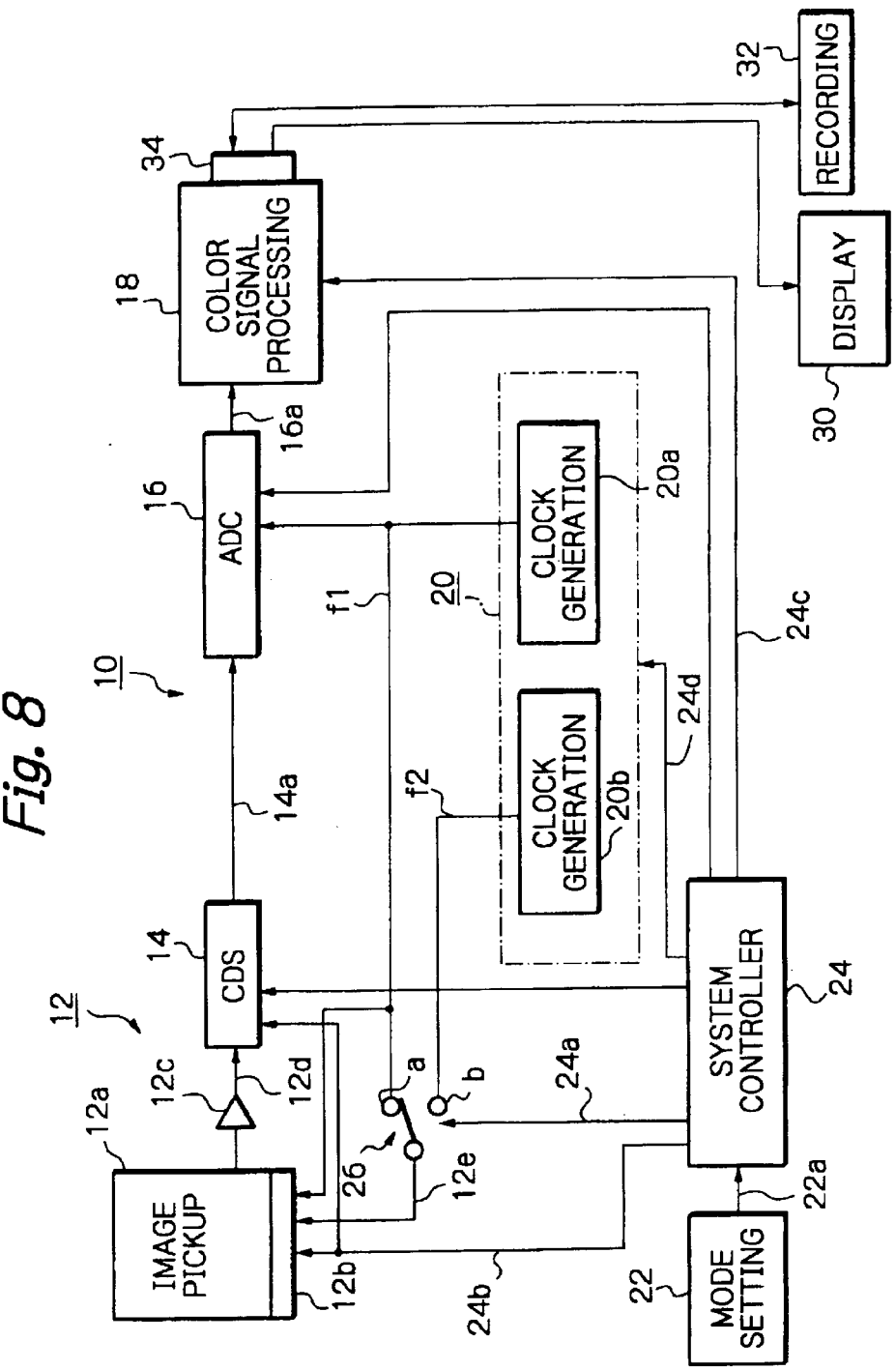
FIG. 8 is a schematic block diagram showing a second modification of the illustrative embodiment.
Figure 9:
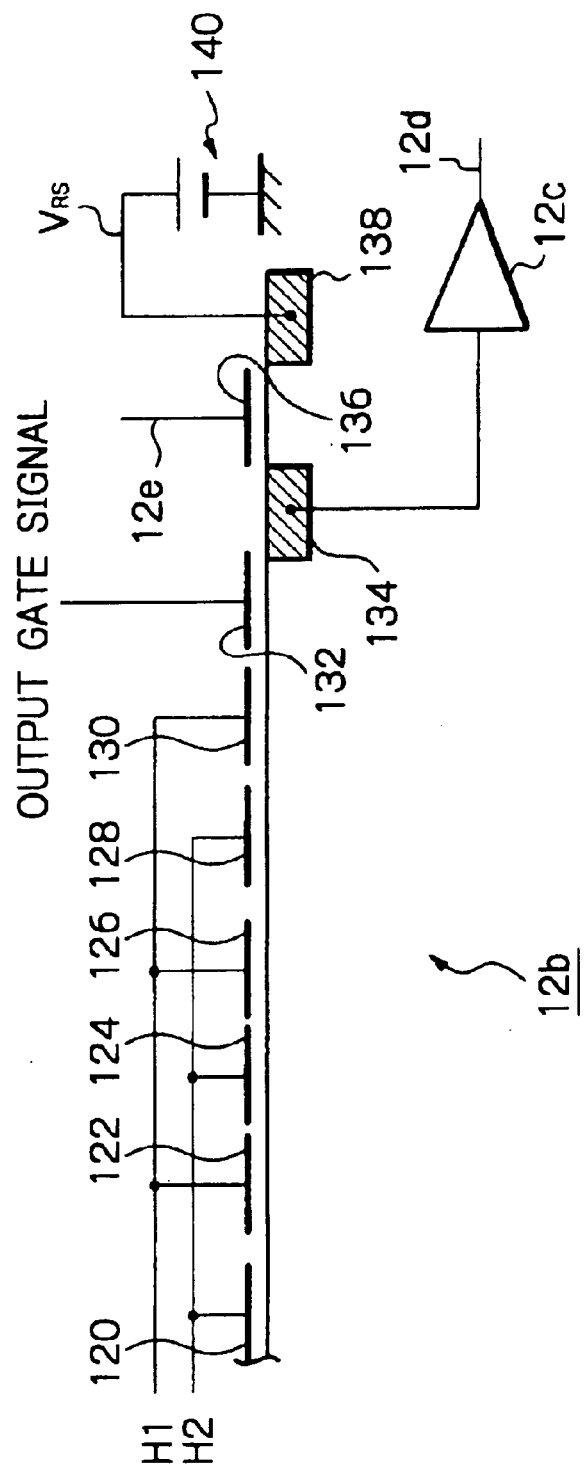
FIG. 9 is a circuit diagram showing the general configuration of a horizontal transfer path included in the second modification.

Reference will be made to FIGS. 8 and 9 for describing a second modification of the illustrative embodiment. In this modification, too, structural elements identical with the elements of the illustrative embodiment are designated by identical reference numerals and will not be described specifically in order to avoid redundancy. As shown, the clock generation 20a and a reset gate 136 included in the horizontal transport path 12b are connected to each other. In this configuration, the first clock f1 output from the clock generation 20a is applied to the reset gate 136 of the horizontal transport path 12b FIG. 9 shows part of the general configuration of the horizontal transport path 12b in an enlarged scale. As shown, the transport path 12 includes transfer electrodes 120, 122, 124, 126, 128 and 130 sequentially arranged toward the output end in this order. Drive signals HI and H2 different in phase from each other by 180° are respectively applied to the transfer electrodes 122, 126 and 130 and transfer electrodes 120, 124 and 128. The drive signals H1 and H2 are respectively shown in FIGS. 10, (a) and (b) specifically. An output gate 132 is positioned next to the transfer electrode 130 closest to the output end of the transport path 12b. A charge detecting portion 134 adjoins the output gate 132 and outputs a detected charge via the output amplifier 12c. The reset gate 136 is arranged in the charge detecting portion 134. A drain 138 is formed in the vicinity of the reset electrode 136 for releasing a charge at the time of resetting. A power supply 140 is connected to the drain 138 and applies a voltage $V_{rs}$ to the drain 138.

Assume that the operator selects the high picture quality mode on the mode setting 22 of the above second modification. The high picture quality mode allows a still picture to be recorded in the recording 32. In the high picture quality mode, the system controller 24 causes the clock selector 26 to select the terminal a with the control signal 24a. As a result, the first clock f1 output from the clock generation 20a is fed to the image pickup 12 and CDS 14. At the same time, the clock f1 is applied to the reset electrode 136 for resetting the signal charge of the charge detecting portion 134; in this sense, the clock f1 plays the role of a reset signal (see FIG. 10, (c)). As FIGS. 10, (a) (b) and (c) indicate, the drive signals H1 and H2 and rest signal each have a period of 1/clock f1. Such drive of the image pickup 12 causes the image signal output from the image pickup 12 to be also read at the rate of the clock f1 (see FIG. 10, (d)).

In FIG. 10, outputs (e)–(h) are identical with the outputs (b)–(e) of FIG. 4 appearing in the still picture shoot mode of the illustrative embodiment. Specifically, in the high picture quality mode, information are read out of all of substantially the same pixels as in the still picture shoot mode and then subjected to processing relating to recording at the color signal processing 18. The processed image signal is sent from the color signal processing 18 to the recording 32. The recording 32 writes the input image signal in the recording medium mounted thereon. With this procedure, it is possible to record a picture in the recording medium with high resolution.

When the operator of the camera 10 selects the AE/AF mode on the mode setting 22, the system controller 24 causes the clock selector 26 to select the terminal b. At this instant, the drive signals H1 and H2 assigned to the horizontal transfer path 12b and derived from the second clock f2 each are provided with a period of 1/24 MHz. Further, because the reset signal is implemented by the first clock f1, the colors G and R of the GR line and appearing over the duration of 1/clock f1 (=1/12 MHz) are added and output as (G+R). As a result, the image pickup 12 outputs the image signal (d), FIG. 10, to the CDS 14. In response, the CDS 14 samples the image signal (G+R) in accordance with the clock f2 (see FIG. 10, (e)).

In the event of the transfer of signal charges from the vertical transport paths, not shown, to the horizontal transport path 12b, pixels to be transferred and the pixels not to be transferred are controlled every other pixel. For example, by using the clock f1 for the above transfer, it is possible to read only the color G or the color R. In such a case, to obtain a signal charge every other pixel easily, use may be made of an image-pickup section having a honeycomb structure in which nearby pixels are shifted from each other by one half of a pixel pitch.

The ADC 16 samples the output signal of the CDS 14 at times indicated by arrows 203 in FIG. 10, (e) for thereby digitizing it (see FIG. 10, (f)). The digital signal mixed with the color (G+R) is input to the color signal processing 18. Although such a mixed signal is not usable when it comes to a picture, it is sufficiently usable for photometry in the AE/AF mode. For photometry, the color G should advantageously be used alone. Photometry in the AE/AF mode allows one frame of image signal to be read at a higher speed than in the high picture quality mode and can therefore be rapidly effected.

In summary, it will be seen that the present invention provides a solid-state image pickup apparatus having various unprecedented advantages, as follows. In a still picture shoot mode, the apparatus allows all of its pixels to be read so as to realize a high resolution image with a minimum of noise although the above mode needs a substantial period of time to complete. In a movie mode, the apparatus allows a picture to be read at a higher speed than in the still picture shoot mode and thereby realizes a synchronous movie without resorting to a frame memory. The apparatus therefore consumes a minimum of power. Further, pixels are reduced in number not only in the vertical direction but also in the horizontal direction at the time of reading, so that the resulting picture is well balanced, compared to conventional pictures. Moreover, a particular clock can be assigned to each of an image pickup section and an ADC in order to enhance design freedom as to the reading of the image pickup section. In addition, a clock suitable for signal processing to be executed by circuitry to follow can be assigned to the ADC for reducing changes in the circuitry and promoting easy signal handling.

While the present invention has been described with reference to the illustrative embodiment, it is not to be restricted by the embodiment. It is to be appreciated that those skilled in the art can change or modify the embodiment without departing from the scope and spirit of the present invention.

The entire disclosure of Japanese patent application No. 289374/1998 filed Oct. 12, 1998 including the specification, claims, accompanying drawings and abstract of the disclosure is incorporated herein by reference to its entirety.

What is claimed is:

1. A solid-state image pickup apparatus comprising:
    a mode setting circuit for allowing an operator to select desired one of a plurality of modes matching with a display format of a display which displays a video signal fed thereto;
    a clock generating circuit for generating a plurality of clocks including a first clock and a second clock higher in frequency than said first clock;
    a frequency selector for selecting either one of said first clock and said second clock in accordance with a mode fed from said mode setting circuit;
    an image pickup section including a plurality of photosensitive cells for transforming, by photoelectric transduction, light incident thereto from a scene to be picked up, said image pickup section picking up said scene and producing signal charges representative of said scene in accordance with an output of said frequency selector;
    a noise reducing circuit for reducing noise components included in a signal output from said image pickup section;
    a digitizing circuit for converting an output of said noise reducing circuit to a digital signal in accordance with said first clock, irrespective of which of said first and second clocks said frequency selector selects, an amount of the digital signal being substantially proportional to a ratio of said first clock to a clock outputted from said frequency selector;
    a signal processing circuit for processing an output of said digitizing circuit in a manner matching with picture display and/or recording; and
    a controller for controlling said clock generating circuit, said frequency selector, said image pickup section, said noise reducing circuit, said digitizing circuit, and said signal processing circuit;
    wherein said plurality of modes include a first mode in which said frequency selector outputs said first clock and a second mode in which said frequency selector outputs said second clock.

2. An apparatus in accordance with claim 1, further comprising:
    a color separating circuit for separating a signal output via color filters included in said image pickup section color by color;
    a frequency band limiting circuit for limiting a frequency band of each output of said color separating circuit; and
    a multiplexing circuit for multiplexing outputs of said frequency band limiting circuit;
    wherein said color separating circuit, said frequency band limiting circuit and said multiplexing circuit are arranged between said noise reducing circuit and said digitizing circuit.

3. An apparatus in accordance with claim 2, wherein said frequency band limiting circuit passes, in said second mode, a frequency lower than a frequency in said first mode.

4. An apparatus in accordance with claim 2, wherein said frequency band limiting circuit includes an analog adding circuit for adding, among color-by-color analog signals each corresponding to a particular one of said photosensitive devices, a signal adjoining a subject position.

5. An apparatus in accordance with claim 1, wherein said clock generating circuit feeds said first clock as, among signals to be fed to a transfer path of said image pickup section, a control signal for controlling an operation of a resetting device for resetting a signal detected on said transport path.

6. An apparatus in accordance with claim 5, wherein said plurality of modes further include a third mode in which an output of said frequency selector and an output to be fed to said resetting device comprise said first clock, and a fourth mode in which said output to be fed to said resetting device comprises said first clock while an output of said frequency selector comprises said second clock.

7. An apparatus in accordance with claim 1, wherein said clock generating circuit generates said first clock and said second clock which are in an integral ratio to each other.

8. An apparatus in accordance with claim 1, wherein said image pickup section includes vertical transfer paths for transferring signals output from said photosensitive devices in a direction of columns, and a horizontal transfer path for transferring said signals fed via said vertical transfer paths in a direction of rows, and wherein said controller controls transfer of said signals from said vertical transfer paths to said horizontal transfer path by distributing said signals on an photosensitive device basis.

9. An apparatus in accordance with claim 1, wherein nearby ones of said plurality of photosensitive devices have geometric centers shifted from each other by a distance corresponding to one half of a pitch of said plurality of photosensitive devices in a direction of rows and/or a direction of columns.

10. An apparatus in accordance with claim 1, wherein said signal processing circuit includes a video outputting circuit for feeding a processed signal to said display.

11. A method of signal processing comprising:
    a mode setting step of selecting desired one of a plurality of modes which matches with a display format in which a video signal fed is displayed;
    a clock generating step of generating a plurality of clocks including a first clock and a second clock which is higher in frequency than the first clock;
    a frequency select step of selecting either one of the first clock and the second clock in accordance with the one mode selected;
    an image pickup step of picking up a scene and producing a signal representative of the scene in response to the selected clock by using an image pickup device;
    a noise reduction step of reducing noise components included in the signal produced by said image pickup step;

a digitizing step of converting an output the signal from which the noise components have been reduced by said noise reduction step to a digital signal in response to the first clock, irrespective of which of said first and second clocks said frequency selector selects, an amount of the digital signal being substantially proportional to a ratio of said first clock to a clock outputted from said frequency select step; and a signal processing step of processing the digital signal in a manner matching with picture display or recording to produce the video signal;

wherein said plurality of modes include a first mode in which the first clock is selected and a second mode in which selects said second clock is selected.

12. A method in accordance with claim 11, wherein the image pickup device includes color filters, said method further comprising prior to said digitizing step:

a color separating step of separating the signal from which the noise components have been reduced into color component signals in accordance with the color filters;

a frequency band limiting step of limiting a frequency band of each of the color component signals; and a multiplexing step of multiplexing signal of which the frequency band has been limited.

13. A method in accordance with claim 12, wherein said frequency band limiting passes, in said second mode, a frequency lower than a frequency in said first mode.

14. A method in accordance with claim 12, wherein said frequency band limiting step includes an analog adding step of adding, with respect to color of the color component signals, one color component signal to another color component signal adjoining the one color component signal.

15. A method in accordance with claim 11, wherein said clock generating step feeds the first clock as a control signal for controlling an operation of resetting a signal detected on a transfer path of the image pickup device.

16. A method in accordance with claim 15, wherein said plurality of modes further include a third mode in which the one clock selected by said frequency selected step and the control signal comprise the first clock, and a fourth mode in which the control signal comprises the first clock while the one clock selected by said frequency select step comprises the second clock.

17. A method in accordance with claim 11, wherein the first clock and the second clock which are in an integral ratio to each other.

18. A method in accordance with claim 11, wherein said signal processing step includes a video outputting step of matching the video signal to the display format to visualize the scene represented by the video signal.

* * * * *